(12) United States Patent
Schmidtchen et al.

(10) Patent No.: US 12,051,170 B2
(45) Date of Patent: Jul. 30, 2024

(54) VISUAL TECHNIQUES FOR 3D CONTENT (71) Applicant: Apple Inc., Cupertino, CA (US)

(72) Inventors: Bryce L. Schmidtchen, San Francisco, CA (US); Bryan Cline, Sunnyvale, CA (US); Charles O. Goddard, Los Angeles, CA (US); Michael I. Weinstein, Greenbrae, CA (US); Tsao-Wei Huang, Sunnyvale, CA (US); Tobias Rick, Mountain View, CA (US); Vedant Saran, Campbell, CA (US); Alexander Menzies, Menlo Park, CA (US); Alexandre Da Veiga, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/371,243

(22) Filed: Sep. 21, 2023

(65) Prior Publication Data
US 2024/0104872 A1 Mar. 28, 2024

Related U.S. Application Data (60) Provisional application No. 63/409,527, filed on Sep. 23, 2022.

(51) Int. Cl.
G06T 19/20 (2011.01)
G06T 5/70 (2024.01)
(Continued)

(52) U.S. Cl.
CPC ............... *G06T 19/20* (2013.01); *G06T 5/70* (2024.01); *G06T 15/04* (2013.01); *G06T 15/10* (2013.01);
(Continued)

(58) Field of Classification Search
CPC ....... G06T 5/002; G06T 19/006; G06T 19/20; G06T 15/04; G06T 15/10;
(Continued)

(56) References Cited

U.S. PATENT DOCUMENTS

2012/0236179 A1* 9/2012 Okuno ................ G06F 3/0304
348/231.6
2016/0042569 A1* 2/2016 Wyld .................. G06T 19/006
345/633
(Continued)

FOREIGN PATENT DOCUMENTS

WO 2022/086580 A1 4/2022

OTHER PUBLICATIONS

European Patent Office, Extended European Search Report issued Feb. 19, 2024 which pertains to EP Patent Application No. 23198706. 6. 9 pgs.

*Primary Examiner* — Daniel F Hajnik
(74) *Attorney, Agent, or Firm* — Thompson Hine LLP (57) ABSTRACT Various implementations provide a view of a 3D environment including a portal for viewing a stereo item (e.g., a photo or video) positioned a distance behind the portal. One or more visual effects are provided based on texture of one or more portions of the stereo item, e.g., texture at cutoff or visible edges of the stereo item. The effects change the appearance of the stereo item or the portal itself, e.g., improving visual comfort issues by minimizing window violations or otherwise enhancing the viewing experience. Various implementations provide a view of a 3D environment including an immersive view of a stereo item without using portal. Such a visual effect may be provided to partially obscure the surrounding 3D environment.

23 Claims, 5 Drawing Sheets (51) Int. Cl.
    *G06T 15/04*       (2011.01)
    *G06T 15/10*       (2011.01)
    *G06T 19/00*       (2011.01)

(52) U.S. Cl.
    CPC .... *G06T 19/006* (2013.01); *G06T 2219/2004* (2013.01)

(58) Field of Classification Search
    CPC . G06T 2219/2004; G06T 11/00; G06T 15/20; G06T 19/003; G06F 3/011
    See application file for complete search history.

(56) References Cited

U.S. PATENT DOCUMENTS

| | | | |
|---|---|---|---|
| 2017/0228931 A1* | 8/2017 | Parker | G06T 19/006 |
| 2019/0272026 A1 | 9/2019 | Bronder | |
| 2020/0289935 A1* | 9/2020 | Azmandian | A63F 13/53 |
| 2020/0334893 A1* | 10/2020 | Jiang | G06T 19/006 |
| 2023/0319144 A1* | 10/2023 | Smith | G06T 19/003 463/42 |

\* cited by examiner

VISUAL TECHNIQUES FOR 3D CONTENT

CROSS-REFERENCE TO RELATED APPLICATIONS

This application claims the benefit of U.S. Provisional Application Ser. No. 63/409,527 filed Sep. 23, 2022, which is incorporated herein in its entirety.

TECHNICAL FIELD

The present disclosure generally relates to presenting stereo items such as stereo photos and stereo videos including, but not limited to, presenting such representations within 3D environments such as extended reality (XR) environments.

BACKGROUND

Various techniques are used to enable people to view stereo items such as stereo photos and stereo videos. However, existing techniques may not provide comfortable or otherwise desirable viewing experiences for viewing such stereo items.

SUMMARY

Various implementations disclosed herein include devices, systems, and methods that provide a view of a 3D environment including a portal for viewing a stereo item (e.g., a photo or video), where the stereo item is positioned a distance behind the portal. One or more visual effects are provided based on the texture of one or more portions of the stereo item, e.g., the texture at cutoff or visible edges of the stereo item. The visual effects change the appearance of the stereo item or the portal itself, e.g., improving visual comfort issues by minimizing window violations or otherwise enhancing the viewing experience. One exemplary visual effect may be provided by a first layer (e.g., an inside layer) that affects the appearance of portions of the stereo item that are visible near the edges of the portal, e.g., providing a blend/blur that decreases from side/edge regions. A second exemplary visual effect may be provided by a second layer (e.g., on a background plane surrounding the stereo item) that provides content that is visible beyond the sides of the stereo item. A third exemplary visual effect may be a rim layer that affects the appearance of the portal edges, e.g., providing glassy highlights. These and other visual effects may be provided in various combinations to provide a desirable viewing experience.

In some implementations a processor performs a method by executing instructions stored on a computer readable medium. The method may be performed at a device having a processor. The method positions a portal within a three-dimensional (3D) coordinate system corresponding to a 3D environment. The method positions a stereo item within the 3D coordinate system at a distance behind the portal. The method positions a visual effect layer within the 3D coordinate system and provides a view of the 3D environment based on a viewpoint in front of the portal within the 3D coordinate system. The stereo item is at least partially visible through the portal in the view of the 3D environment and the visual effect layer affects the appearance of the portal or content visible through the portal in the view.

Various implementations disclosed herein include devices, systems, and methods that provide a view of a 3D environment including an immersive view of a stereo item (e.g., a photo or video). The immersive view may not include a portal. A visual effect may be provided to partially obscure the surrounding 3D environment, e.g., the content visible in the view around the sides of the stereo item. For example, this may involve using an alpha fade around the edges that decreases based on distance away from the stereo item. In some implementations a processor performs a method by executing instructions stored on a computer readable medium. The method may be performed at a device having a processor. The method positions a portion of a stereo item within a 3D coordinate system corresponding to a 3D environment and provides a view of the 3D environment. The view may include the portion of the stereo item and a visual effect that partially obscures a portion of the view surrounding the stereo item.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Figure 1:
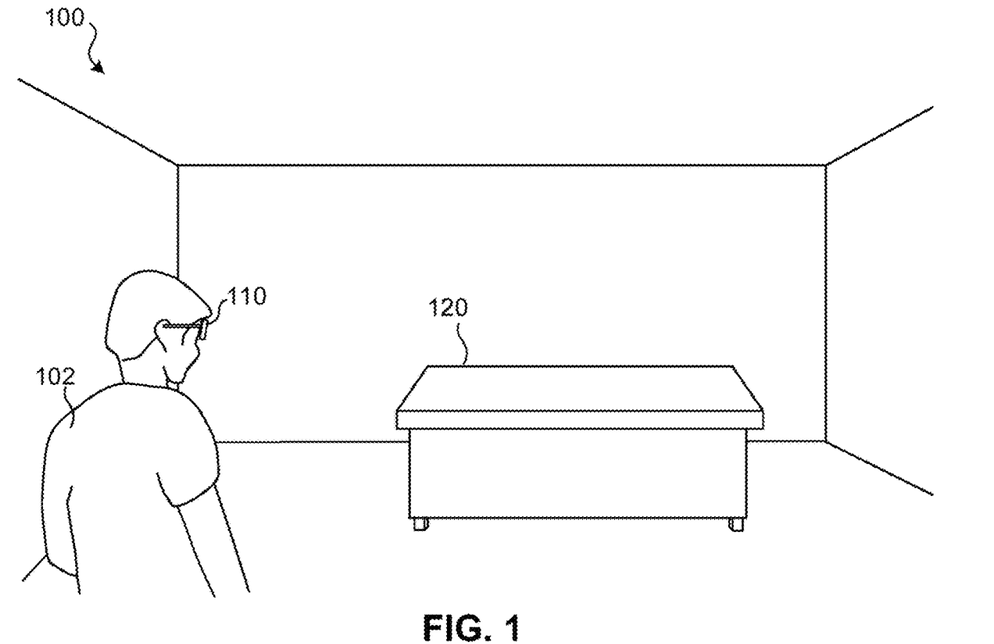
FIG. 1 illustrates an exemplary electronic device operating in a physical environment, in accordance with some implementations.

FIG. 1 illustrates an exemplary electronic device 110 operating in a physical environment 100. In this example of FIG. 1, the physical environment 100 is a room that includes a desk 120. The electronic device 110 includes one or more cameras, microphones, depth sensors, or other sensors that can be used to capture information about and evaluate the physical environment 100 and the objects within it, as well as information about the user 102 of the electronic device 110. The information about the physical environment 100 or user 102 may be used to provide visual and audio content and/or to identify the current location of the physical environment 100 and/or the location of the user within the physical environment 100.

In some implementations, views of an extended reality (XR) environment may be provided to one or more participants (e.g., user 102 or other participants not shown). Such an XR environment may include views of a 3D environment that is generated based on camera images and/or depth camera images of the physical environment 100 as well as a representation of user 102 based on camera images and/or depth camera images of the user 102. Such an XR environment may include virtual content that is positioned at 3D locations relative to a 3D coordinate system associated with the XR environment, which may correspond to a 3D coordinate system of the physical environment 100. In some implementations, views of an XR environments may be provided using a transparent or translucent display in which virtual content is overlaid on a view of the physical environment 100 seen through the transparent or translucent display.

Figure 2:
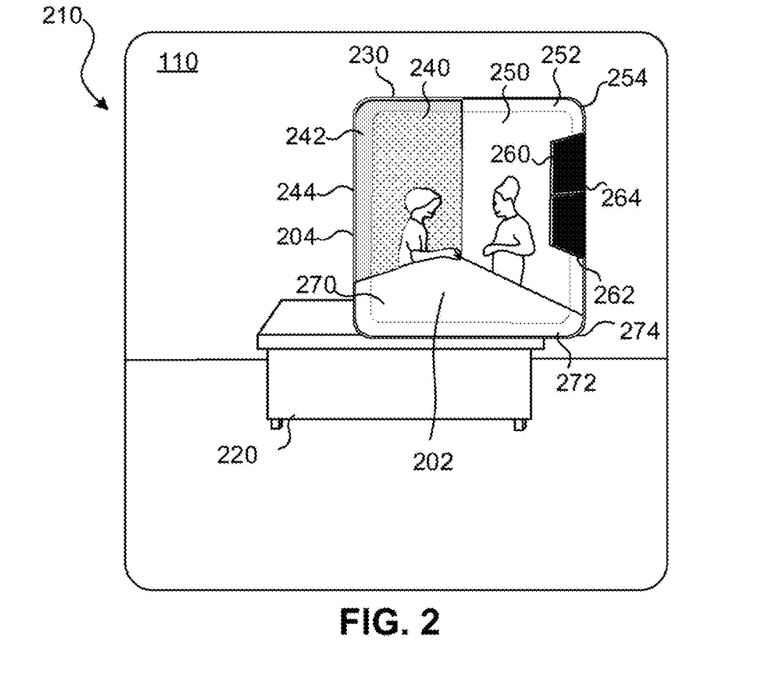
FIG. 2 illustrates a view including a stereo item viewed through a portal in a 3D environment based on the physical environment of FIG. 1 in accordance with some implementations.

FIG. 2 illustrates a view 210 including a stereo item viewed through a portal in a 3D environment that is based on the physical environment 100 of FIG. 1. Providing such a view 210 may involve determining 3D attributes of the physical environment 100 and positioning the virtual content, e.g., the portal and stereo item, in a 3D coordinate system corresponding to that physical environment 100. In this example, the view 210 includes a depiction 220 of the desk 120 and a depiction 230 of the portal with the stereo content item visible through the portal.

The term "portal" refers to a defined region (e.g., a virtual window-like region) positioned within a 3D coordinate system of a 3D environment that affects which content behind the portal in the 3D environment is visible through the portal in views of the 3D environment. For example, from a given viewpoint, a view of a 3D environment that does not include a portal may depict some, and exclude some, items of a 3D environment, e.g., depicting only depiction 220 of desk 120 while excluding the stereo content item. A portal may make otherwise excluded items visible within the view. For example, viewing portions of the 3D environment through the portal may reveal items that are excluded from non-portal views. As a specific example, a direct view (e.g., not through a portal) of the portion of the 3D environment that includes a stereo item from a given viewpoint would not show the stereo item. In contrast, the same view from the same viewpoint in which a portal is positioned between the viewpoint and the stereo item would show the virtual content item instead of (or in addition to) the other content items that are also behind the portal. In some implementations, a direct view of a 3D environment shows only depictions of physical items (e.g., the desk 120 and other items of physical environment 100), while virtual items (e.g., one or more stereo content items) are only visible through one or more portals.

A portal may or may not have visible components. In the example of FIG. 2, the portal includes a central portion 202 that is transparent or at least partially transparent. Thus, the stereo item, including stereo item portions 240, 250, 260, 270, is visible in the view 210 through the central portion 202 of the portal. In some implementations, the central portion 202 of the portal has a partially transparent appearance, e.g., appearing glassy, reflecting some specular highlights based on real or virtual light sources in the 3D environment, etc. A rim 204 of the portal is visible and includes rim segments 244, 254, 264, 274. Such a rim 204 may be planar and thus aligned with planar central portion 202 of the portal or may have a 3D shape or thickness, e.g., being curved, rounded, full bull-nosed, half bull-nosed, ogee-edged, beveled, square, etc. at its edges.

Using a portal to view certain content (e.g., content that is not otherwise included in views of a 3D environment) may provide advantages in viewing virtual content such as stereo items. For example, it may enhance the 3D appearance of a stereo item while minimizing visual conflict with surrounding 3D environment content or otherwise improve visual comfort. Using a portal that is positioned a distance in front of such content and that has at least some visible characteristics (e.g., visible rims, specular reflections, etc.) may also provide advantages with respect to improving the viewing of virtual content such as stereo items.

The term "stereo item" refers to a content item such as a stereo photo or stereo video for which different content is available, stored, or generated for different eye (e.g., left eye and right eye) viewpoints. In the context of presenting a stereo item within a 3D environment, a stereo item may be positioned on a planar (flat planar, curved planar, semispherical shell planar, warped planar, etc.) surface at a 3D position within a 3D coordinate system of the 3D environment. Such a stereo item may then be depicted in views of the 3D environment. Such a view may be a stereo view with each eye viewing the 3D environment from slightly different viewpoints. Thus, the view 210 is a stereo view that enables the user to perceive depth in the depiction 220 of the desk 120. Moreover, the stereo item that is presented on the planar surface may have a 3D appearance or otherwise provide the appearance of depth within it even though it is displayed on a planar surface. The appearance of depth in the stereo item may be provided by using the stereo item's eye-specific content for the slightly different view provided to each eye, e.g., the planar surface may be displayed using the left eye content in the left eye view and the planar surface may be displayed using the right eye content in the right eye view. The appearance of depth in the stereo item may additionally or alternatively be provided or simulating parallax in the presentation of the stereo content item, e.g., by shifting the content on the planar surface based on viewpoint/head motion relative to the stereo item or the planar surface upon which the stereo item is displayed.

In the example of FIG. 2, a portion of the stereo item is visible through the portal in the view 210. One or more additional features (e.g., layers) are used to enhance or change the appearance of the portal or the portion of the stereo item that is visible through the portal.

Figure 4:
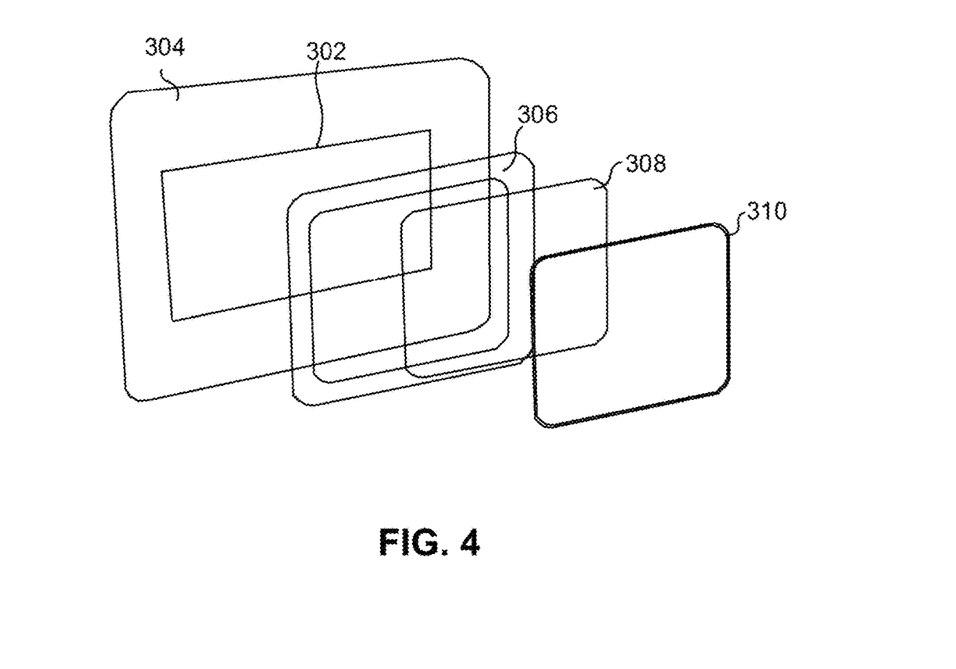
FIG. 4 illustrates positioning of the multiple layers of FIG. 3, in accordance with some implementations.

A first layer is used to blend or otherwise change the appearance of parts of the stereo item that are visible close to the rim 204 of the portal in the view 210. Specifically, the first layer changes the appearance of part 242 of stereo item portion 240, part 252 of stereo item portion 250, part 262 of stereo item portion 260, and part 272 of stereo item portion 270. Such a first layer may be positioned between the portal and the stereo item such that it affects the appearance of some of the parts of the stereo item that appear to be close to the rim 204 from multiple viewpoints in front of the portal. FIG. 4, described below, illustrates such positioning.

The first layer is configured to affect the appearance of those parts 242, 252, 262, 272 based on portions of the corresponding stereo item. Specifically, the first layer is configured to change the appearance of part 242 based on the texture (e.g., color, pattern, etc.) of stereo item portion 240, change the appearance of part 252 based on the texture of stereo item portion 250, change the appearance of part 262 based on the texture of stereo item portion 260, and change the appearance of part 272 based on the texture of stereo item portion 270. The texture may be based on the texture of one or both of the eye-specific portions of the stereo item. For example, the textures from the different eye-specific content corresponding to particular corresponding regions may be blended, e.g., the left side content of the left eye-specific content may be blended with the left side content of the right eye-specific content, etc. In some implementations, left eye stereo item content is used (or weighted more heavily) for the texture of left-side of the first layer and right eye stereo item content is used (or weighted more heavily) for the texture of the right-side of the first layer. The blending or selective use of eye-specific content in the first layer may provide desirable appearance advantages, e.g., improving user visual comfort and avoiding discrepancies in the appearance of stereo item near the rim 204.

In the example of FIG. 2, the rim 204 of the portal has an appearance that that is also based on the texture of portions of the stereo content. Another layer (e.g., a rim layer) may be used to provide this appearance, e.g., providing separate layers for the central portion 202 and the rim 204 of the portal. Specifically, the second layer may provide or affect the appearance of rim segment 244 based on a texture of stereo item portion 240, rim segment 254 based on a texture of stereo item portion 250, rim segment 264 based on stereo item portion 260, and rim segment 274 based on stereo item portion 270. Such a second layer may be positioned on or in front of the portal's central portion 202 such that it defines or affects the appearance of the rim 202. FIG. 4, described below, illustrates such positioning.

Figure 3:
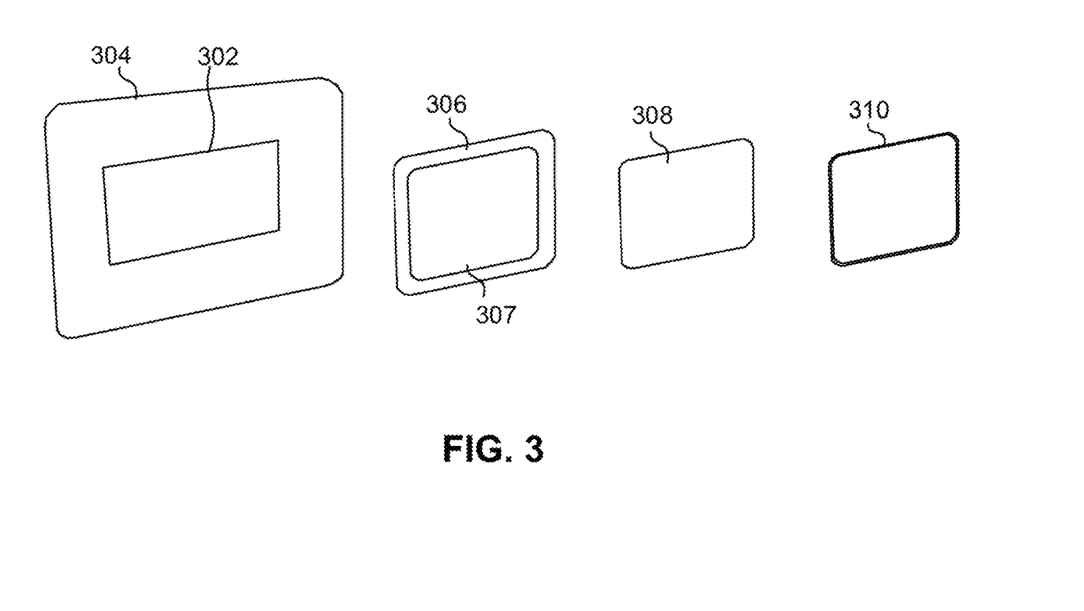
FIG. 3 illustrates multiple layers used to provide a portal-based view of stereo item within a 3D environment, in accordance with some implementations.

FIG. 3 illustrates multiple layers used to provide a portal-based view of stereo item 302 within a 3D environment. In this example, the stereo item 302 is combined on a plane with a background visual effect layer 304, e.g., the background layer content surrounds the stereo item 302 so that it will be visible around the sides of the stereo content in the view 210 when the user, for example, look through the portal from a side angle rather than head on.

The background visual effect layer 304 is configured to alter a subset of the content that is visible through portal 308. In this example, the subset of the content is content that outside of a perimeter of the stereo item 302. In some implementations, the background visual effect layer 304 is based on content from side regions of the stereo item, e.g., at the nearest corresponding edges of the stereo item to the respective portions of the background visual effect layer 304, e.g., the top left side of the background visual effect layer 304 may be based on the top left side of the stereo item 302. In some implementations, stereo item 302 includes only a portion of a source stereo content item, e.g., side, top, and bottom portions may have been cutoff and not used to display the stereo item 302. Such cut-off portions may be used to provide the background visual effect layer. For example, a portion cut-off on the top left side of the stereo item may be used to generate the top left side of the background visual effect layer 304. In some implementations, the background layer effectively provides an environment map defining the environment outside of the stereo content when viewed through the portal 308 in a way that the such outside area is visible. In an alternative implementation, the background layer provides an environmental appearance that is not based on the stereo content, e.g., providing a solid black or other color surrounding.

In some implementations, content of the stereo item is used to provide the background visual effect layer 304. In some implementations, the background visual effect layer 304 content that provides an imaging effect (e.g., blurring, smoothing, filtering, etc.) that is determined or generated based on a texture of the content of the stereo item 302. In some implementations, depth information associated with portions of the stereo item 302 is used to provide the background visual effect layer 304, e.g., providing more blurring for deeper/farther content then for shallower/closer content. An imaging effect provided via the background visual effect layer 304 may depend on its positioning relative to the stereo item 302, e.g., with the amount of content, blend or other visual effect decreasing outwardly (e.g., radially outwardly) from a center of the stereo item 302 on the plane or decreasing gradually (e.g., via a gradient) based on distance from a closest edge of the stereo item 302.

The background visual effect layer 304 may account for or be based on the content of the eye-specific portions of the stereo item 302. For example, the background visual effect layer 304 may be based on the texture of one or both of the eye-specific portions of the stereo item 302. For example, it may be blended. In some implementations, left eye stereo item content is used (or weighted more heavily) for the texture of the left-side of the background visual effect layer 304 and right eye stereo item content is used (or weighted more heavily) for the texture of the right-side of the background visual effect layer 304. The blending or selective use of eye-specific content in the background visual effect layer 304 may provide desirable appearance advantages, e.g., improving user visual comfort.

An inside visual effect layer 306 is also included in the multiple layers used to provide the portal-based view 210 of the stereo item 302 within the 3D environment. The inside visual effect layer 306 is configured to alter a subset of the content that is visible through portal 308. The inside visual effect layer 306 has a transparent center 307 and thus only provides a visual effect around its edges, which will correspond to portions of a user's view through the portal 308 near the edges of the portal 308. In this example, the subset of the content that is altered is content just inside the edges of the portal 308. In some implementations, the inside visual effect layer effectively provides blurring of portions of the stereo content visible near the edges of the portal in the view 210 based on the nearby content of the stereo item that is visible in the view. In an alternative implementation, the inside visual effect layer provides an altered appearance that is not based on the stereo content, e.g., providing consistent blur or blending regardless of the stereo item content.

In some implementations, the inside visual effect layer 306 is based on content from side regions of the stereo item, e.g., at the nearest corresponding edges of the stereo item to the respective portions of the inside visual effect layer 306, e.g., the top left side of the inside visual effect layer 306 may be based on the top left side of the stereo item 302. In some implementations, stereo item 302 includes only a portion of a source stereo content item, e.g., side, top, and bottom portions may have been cutoff and not used to display the stereo item 302. Such cut-off portions may be used to provide the inside visual effect layer 306. For example, a portion cut-off on the top left side of the stereo item 302 may be used to generate the top left side of the inside visual effect layer 306.

Content of the stereo item may be used to provide the inside visual effect layer 306 in various ways. In some implementations, an imaging effect (e.g., blurring, smoothing, filtering, etc.) is determined or generated based on a texture of the content of the stereo item 302. In some implementations, depth information associated with portions of the stereo item 302 is used to provide the inside visual effect layer 306, e.g., providing more blurring for deeper/farther content then for shallower/closer content. An imaging effect provided via the inside visual effect layer 306 may depend on its relative positioning with respect to the stereo item, e.g., decreasing inwardly (e.g., radially) from the edges of the inside visual effect layer 306 (e.g., via a gradient) based on distance from a closest edge of the inside visual effect layer 306.

The inside visual effect layer 306 may account for or be based on the content of the eye-specific portions of the stereo item 302. For example, the inside visual effect layer 306 may be based on the texture of one or both of the eye-specific portions of the stereo item 302. For example, it may be blended. In some implementations, left eye stereo item content is used (or weighted more heavily) for the texture of left-side of the inside visual effect layer 306 and right eye stereo item content is used (or weighted more heavily) for the texture of the right-side of the inside visual effect layer 306. The blending or selective use of eye-specific content in the inside visual effect layer 306 may provide desirable appearance advantages, e.g., improving user visual comfort.

A rim visual effect layer 310 is also included in the multiple layers used to provide the portal-based view 210 of the stereo item 302 within the 3D environment. The rim visual effect layer 310 is configured to create or alter the appearance of a rim 204 of the portal 308. In some implementations, the rim visual effect layer 310 is based on content from side regions of the stereo item 302, e.g., at the nearest corresponding edges of the stereo item 302 to the respective portions of the rim visual effect layer 310, e.g., the top left side of the rim visual effect layer 310 may be based on the top left side of the stereo item 302. In some implementations, stereo item 302 includes only a portion of a source stereo content item, e.g., side, top, and bottom portions may have been cutoff and not used to display the stereo item 302. Such cut-off portions may be used to provide the rim visual effect layer 310. For example, a portion cut-off on the top left side of the stereo item 302 may be used to generate the top left edge of the rim visual effect layer 310.

Content of the stereo item may be used to provide the rim visual effect layer 310 in various ways. In some implementations, the appearance of the rim visual effect layer 310 is determined or generated based on a texture of the content of the stereo item 302. In some implementations, depth information associated with portions of the stereo item 302 is used to provide the rim visual effect layer 310. The rim visual effect layer 310 may account for or be based on the content of the eye-specific portions of the stereo item 302. For example, the rim visual effect layer 310 may be based on the texture of one or both of the eye-specific portions of the stereo item 302. For example, it may be blended. In some implementations, left eye stereo item content is used (or weighted more heavily) for the texture of left-side of the rim visual effect layer 310 and right eye stereo item content is used (or weighted more heavily) for the texture of the right-side of the rim visual effect layer 310. The blending or selective use of eye-specific content in the rim visual effect layer 310 may provide desirable appearance advantages, e.g., improving user visual comfort. The rim visual effect layer 310 may increase the saturation of content from the stereo item and apply a glow effect.

The stereo item 302, background visual effect layer 304, inside visual effect layer 306, portal 308, and rim visual effect layer 310 may have shapes and/or dimensions relative to one another that are configured to provide certain visual characteristics. For example, background visual effect layer 304 may have a size that is sufficiently large to provide background content around the stereo item 302 when viewed through portal 308 from any where within a threshold viewing angle range. In other words, the background visual effect layer 304 may be sufficiently large such that the viewer will not see outside of its edges when viewing from a position having within a determined viewing angle range, e.g., 60°, 70°, 80°, 85°, etc.

In some implementations, the sizes of the stereo item 302 and background visual effect layer 304 are determined based on matching the angular size of the portal 308 from a canonical viewing position/distance, and then scaling the stereo item 302 and background visual effect layer 304 according to how much of those portions the portal 308 is intended to crop/occlude. This may help ensure that the relationship between the content inside the portal 308 and the portal 308 itself is constant regardless of the size of the portal 308.

In some implementations, the sizes of the portal 308 and inner visual effect layer 306 are selected to crop out potentially uncomfortable stereo window violations at the edges of the stereo item 302, as well as to use the portal 308 as a depth cue to increase the stereo effect of the content. A fixed size may be used in some implementations. However, in some implementations, it the size dimensions may be selected based on the content, e.g., providing content-aware sizing.

The inside visual effect layer 306 may have a shape and outer size that accounts for different viewing angles/positions. For example, the size of the inside visual effect layer 306 may be selected such that a left edge of the inside visual effect layer 306 is aligned with a left edge of the stereo item 302 when viewed from a particular viewpoint/viewing angle and a right edge of the inside visual effect layer 306 is aligned with a right edge of the stereo item 302 when viewed from the same or another particular viewpoint/viewing angle. Similarly, the size of the inside visual effect layer may be selected such that a top edge of the inside visual effect layer 306 is aligned with a top edge of the stereo item 302 when viewed from a particular viewpoint/viewing angle and a bottom edge of the inside visual effect layer 306 is aligned with a bottom edge of the stereo item 302 when viewed from the same or another particular viewpoint/viewing angle.

The inside visual effect layer 306 may have a shape and inner size that accounts for different viewing angles/positions. For example, the size of the inside visual effect layer 306 may be selected so that to provide a visual effect will have a predetermined amount (e.g., 6 inches, 5% of the width of the stereo item 302) on a respective side when viewed from a particular viewpoint/viewing angle while providing no visual effect on that side when viewed from a different viewpoint/viewing angle. The inside visual effect layer 306 may have a shape and inner size dimensions such that, from a central viewpoint, the visual effect on all sides (e.g., left, right, top, bottom) is equivalent (e.g., corresponding to the same distance or percentage of the width and height respectively).

The rim visual effect layer 310 is sized to be the same as or slightly larger or smaller than the portal 308 in some implementations. In some implementations, the rim visual effect layer 310 is provided with dimensions such that the rim appears to be a frame or outer portion of the portal 308, e.g., providing visual continuity between the edges of the portal and the rim visual effect layer 310.

FIG. 4 illustrates positioning of the multiple layers of FIG. 3 relative to one another in a 3D environment for the purpose of providing a view 210. In this example, the rim visual effect layer 310, portal 308, inside visual effect layer 306, stereo item 302, and background visual effect layer are located on planes that are positioned parallel to one another. In other implementations, such layers may not be on parallel planes.

In this example, the rim visual effect layer 310 is positioned in front of the portal 308, e.g., separated by a small distance (e.g., 1 mm, 2 mm, 1 cm, 10 cm, etc.). In some implementations, the rim visual effect layer 310 is located on the same plane as the portal 308. The rim visual effect layer 310 may have a depth (e.g., corresponding to the depth of beveling or other edge shape) and the rim visual effect layer 310 may be aligned so that the back of its 3D shape is aligned with the portal 308. In other implementations, a distance between rim visual effect layer 310 and the portal 308 is selected to provide an intended 3D appearance, e.g., a floating rim, etc.

In the example of FIG. 4, the stereo item 302 and background visual effect layer 304 are coplanar. In alternative implementations, the stereo item 302 is in front of the background visual effect layer 304, e.g., relatively closer to the portal 308. In other implementations, the stereo item 302 is behind the background visual effect layer 304, e.g., relatively farther from the portal 308.

The relative positioning between the portal 308 and the stereo item 302 may be determined based on various criteria. The separation or distance of the stereo item 302 behind the portal 308 may be configured to provide or simulate parallax. In one example, a distance of the stereo item 302 behind the portal 308 is determined based on the stereo content itself, e.g., the field of view and thus size of the content of the stereo item 302. The stereo item 302 may be positioned at a distance such that it will appear to be life size when viewed through the portal 308 in a view of the 3D environment. In other implementations, the distance may be selected to provide a particular scaled size relative to life sized, e.g., half sized, double sized, etc. Note that the portal 308 and stereo item 302 need not have the same shape or aspect ratio. For example, the portal may have an aspect ratio associated with a narrower field of view that the stereo item 302.

In the example of FIG. 4, the inside visual effect layer 306 is located between the portal 308 and the stereo item 302 and is positioned relatively closer to the portal 308 than to the stereo item 302. In some implementations, the inside visual effect layer 306 is positioned based on the distance between the portal 308 and the stereo item 302, e.g., on a parallel plane 10%, 20%, 25%, 30%, 35%, 40% etc. of the distance between the portal 308 and the stereo item 302. In some implementations, the inside visual effect layer 306 is positioned on the same plane as the portal 308. However, positioning the inside visual effect layer 306 behind (and thus off plane with) the portal 308 may provide advantages. For example, it may enable a viewer to change the viewpoint of the view (e.g., by walking to the side) and see a portion of the stereo item 302 that might otherwise have been obscured/blurred by a visual effect of the inside visual effect layer 306. The positioning thus may provide a balance between making the user's view more comfortable while enabling the user to see all of the stereo item 302 in full clarity if and when they want.

In some implementations, a portal 308 provides views of multiple, separate stereo items, e.g., multiple items are positioned behind the portal in the 3D coordinate system. Such items may be separated from one another on the same planar surface. In some implementations, the device 110 is configured enable a user to reposition one or more of the stereo items on such a plane in such that which of the one or more stereo items is visible through the portal at a given time changes. For example, the user 102 may provide input to scroll through multiple stereo images placed horizontally and adjacent to one another on such a plane. In some implementations, portions of one or more stereo items relative to the portal are repositioned based on a scroll input. A stereo item may be repositioned based on a distance of the viewpoint and an angle that the portion of the stereo item is scrolled away.

In some implementations, a user is enabled to scroll multiple stereo items visible via respective one or more portals and it is desirable to provide some parallax and to provide some content within the portal that is viewed from a far-off axis. In one example, the system may be configured to display a certain number of portals horizontally in a line, each depicting a different stereo item. The user may scroll the portals (e.g., to the right), causing a portal at one side (e.g., the rightmost portal) to cease being displayed, while revealing a new portal on the other side (e.g., on the left of the horizontal line of portals). Because the stereo item(s) are on a different layer from the portal, when the user scrolls through these items, there may be a parallax effect caused by the different layers moving at different speeds relative to a viewpoint. This can improve perception that the portal is providing content in a way that seems like the viewer is looking into another 3D world through a window. However, if the user scrolls too far (e.g., to the left or right), portions outside of the stereo item may be visible through the portal (e.g., portions to the left or right of stereo item 302 and background visual effect layer 304 may be visible through the portal). This may be addressed by sliding the stereo item plane slightly relative to its portal. For example, the stereo item plane may slide to the right relative to the portal when scrolling right and left relative to the portal when scrolling left such that, when viewed from a viewing position, the right side of background visual effect layer 304 is aligned with the right side of the portal when scrolled to the extreme right position, and the left side of the background visual effect layer 304 is aligned with the left side of the portal when scrolled to the extreme left position. The amount it slides may be a function of the viewpoint's distance to the portal and the angle it is scrolled away from the viewer. This keeps some of the parallax effect with an upper bounds so that relatively more of the content is in view at extreme angles.

In some implementations, a scale (e.g., from −1 to +1, with −1 being the leftmost point on the scroll view, 0 being the centered point, and +1 being the rightmost point on the scroll view) is defined. In some implementations, a max offset x (e.g., in meters) is also defined such that, when the stereo item(s) is shifted by x relative to the portal, it shifts y relative to the user's viewpoint position where y is set to be the over scan amount, such that the image boundary aligns with the portal boundary at the max scroll offset. In this example, x is a linear scaling of y, assuming a fixed viewpoint position. The stereo item(s) may be shifted by x times the current position on the −1 to +1 scale. The user may be assumed to be at the center of the scroll view at the default viewing distance.

The same behavior may not be provided when the user is moving relative to a static portal. This difference may provide greater user privacy, a physically accurate sense of parallax when moving around, or prevent distortion from off-axis stereo viewing, choosing to show a blur/glow instead. In these examples, scrolling is provided in a way that may be inconsistent with physically realistic parallax, however, doing so may be worth the inconsistency to enable the viewer to preview the next and previous assets while in the scroll view.

Figure 5:
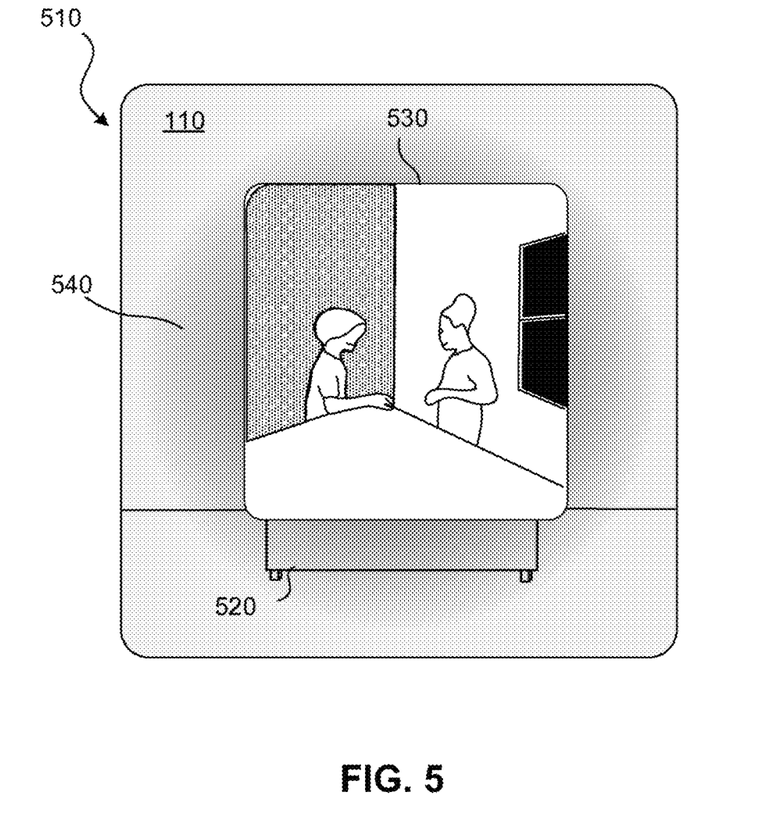
FIG. 5 illustrates an immersive view of a stereo item viewed within a 3D environment based on the physical environment of FIG. 1, in accordance with some implementations.

FIG. 5 illustrates an immersive view 510 of a portion of stereo item 302 viewed within a 3D environment based on the physical environment 100 of FIG. 1. In this example, the view 510 depicts the stereo item without using a portal. The view 510 differs from the view 210 of FIG. 2, e.g., not having a portal, displaying a larger version of the stereo item, and using different visual effects. In some implementations, a device provides multiple viewing modes (e.g., portal-based and immersive viewing modes) and enables a user to view stereo items using either mode and to transition from one mode to the other.

In FIG. 5, the stereo item 302 is displayed based on being positioned on a planar (flat planar, curved planar, semi-spherical shell planar, warped planar, etc.) surface at a 3D position within a 3D coordinate system of a 3D environment. Such a 3D environment may (and in the FIG. 5 example is) based on the physical environment 100 of FIG. 1. The view 510 of the 3D environment thus includes depiction 520 of desk 120 and a depiction 530 of the stereo item 302. The depiction 530 of the stereo item 302 may be scaled to provide a one-to-one scale perspective.

The appearance of depth in the stereo item 302 may be provided by using the stereo item's eye-specific content for the slightly different view provided to each eye, e.g., the planar surface is displayed using the left eye content in the left eye view and the planar surface is displayed using the right eye content in the right eye view. The appearance of depth in the stereo item may additionally or alternatively be provided by accounting for parallax in the presentation of the stereo content item, e.g., adjusting the content based on viewpoint relative to the stereo item or the planar surface upon which the stereo item is displayed.

The view 510 further includes a visual effect 540 configured to improve the visual experience, e.g., by emphasizing the immersive experience of the stereo item 302 while still providing some, limited context of surrounding portions of the 3D environment. In this example, the visual effect 540 partially obscures the depictions the surrounding 3D environment. Such an effect may depend on the relative positioning or nearness of the stereo item 302, e.g., providing an effect that decreases outwardly (e.g., radially outwardly) from a center of the depiction 530 of the stereo item 302 on the plane or decreasing gradually (e.g., via a gradient) based on distance from a closest edge of the depiction 530 of stereo item 302. In some implementations, the visual effect provides an alpha fade outside of the edges of the depiction 530 of the stereo item 302.

In some implementations, a view transitions from a portal-based view (e.g., illustrated in FIG. 2) to an immersive view (e.g., illustrated in FIG. 5). The transition may occur instantly or over an observable period of time. In some implementations, the transitioning involves expanding the depiction of the portal before removing the portal, expanding the portion of the stereo item, removing the visual effect and then providing a new visual effect, where the new visual effect affects an appearance of the 3D environment visible around the stereo item in the view.

In some implementations, a stereo audio change occurs along with the view transition from portal-based to immersive or vise versa. For example, during the portal-based view, the audio of the stereo item may be spatialized to sound as if it is coming from in front of the viewpoint, e.g., from the portal or behind the portal. In the immersive mode, the audio may be spatialized to appear to be coming from all around the viewpoint based on the surrounding locations of the sources of the audio in the recording environment when the stereo item was recorded.

The transition between stereo item viewing mode may change the visual effect that is visible to the sides of the stereo item. For example, when transitioning from the portal-based view to the immersive view, the content outside of the stereo item may no longer provide an extension of the image (e.g., blurring based on image content). Instead, the content outside of the stereo content may provide a partially translucent fall off. Rather than being opaque (e.g., a blend of stereo content alone), an alpha fade around the edge may blur or otherwise visually change the appearance of the 3D environment that is separate from the stereo item, e.g., blurring the depiction 520 of the desk 120.

The use of visual effects with portal-based and immersive views of stereo items within 3D environments can provide various benefits. Such visual effects may enable relatively modest field of view content (e.g., 90 degree FOV stereo content) to be provided with visual effects that make the experience feel more immersive than it otherwise would, e.g., a more immersive experience can be achieved without requiring the use of larger field of view content that may be more resource intensive to store and process. Rather, a sense of immersion can be provided using a visual effect without needing a very wide field of view lens. In some implementations, the stereo content includes information about a larger field of view (e.g., a wide FOV image associated with a narrow FOV stereo content item) than is actually provided for high resolution display. The information about the larger field of view may be used to drive a blur or other visual effect applied to enhance a narrower field of view piece of stereo content.

The portal-based view may provide advantages, e.g., enhanced visual comfort, with respect to the close-up objects. Such object may appear to be behind the front of the portal and thus not cause an uncomfortable viewing experience that might otherwise be created if such objects extended out towards the user, e.g., beyond the bounds of the portal when not in the immersive mode.

Implementations disclosed herein may help address one or more issues in rendering stereo items. Such issues may include, but are not limited to, the appearance of window violations (e.g., causing discomfort around the edges of stereo items), discomfort caused by the slightly different fields of view offset from one another (e.g., an object being present in the far left of one eye's view but not visible at all in the other eye's view), image non-responsiveness to head movement (e.g., if the viewer moves their head and the appearance of the stereo item warps or otherwise does not respond as expected), and other issues with general comfort in viewing stereo items.

Figure 6:
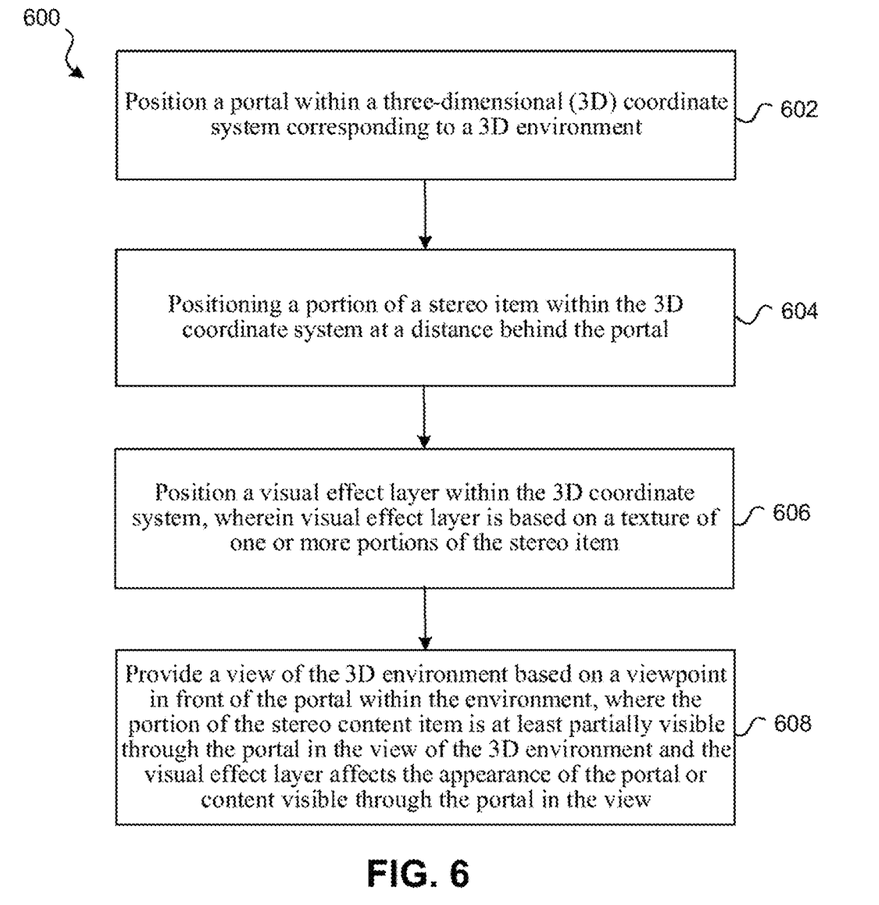
FIG. 6 illustrates an exemplary process for providing a portal-based view of a stereo content item within a 3D environment, in accordance with some implementations.

FIG. 6 illustrates an exemplary process for providing a portal-based view of a stereo content item within a 3D environment. In some implementations, a device such as electronic device 110 or another device, or a combination of two or more of such devices, performs method 600. In some implementations, method 600 is performed on a mobile device, desktop, laptop, HMD, ear-mounted device or server device. The method 600 is performed by processing logic, including hardware, firmware, software, or a combination thereof. In some implementations, the method 600 is performed on a processor executing code stored in a non-transitory computer-readable medium (e.g., a memory).

At block 602, the method 600 positions a portal within a three-dimensional (3D) coordinate system corresponding to a 3D environment (e.g., a physical or XR environment). At block 604, the method 600 positions a portion of a stereo item (e.g., it may be cropped portion or all of a stereo photo/video item) within the 3D coordinate system at a distance behind the portal. At block 606, the method 600 positions a visual effect layer within the 3D coordinate system, wherein visual effect layer is based on a texture of one or more portions of the stereo item. Examples of positioning such components are discussed above with respect to FIG. 4.

At block 608, the method 600 provides a view of the 3D environment based on a viewpoint in front of the portal within the environment, where the portion of the stereo content item is at least partially visible through the portal in the view of the 3D environment and the visual effect layer affects the appearance of the portal or content visible through the portal in the view.

The stereo content item may include a left eye image of the stereo item and a right eye image of the stereo item and the view may include a left eye view based on the left eye image of the stereo item and a right eye view based on the right eye image of the stereo item.

In some implementations, the visual effect layer is configured and positioned to alter a subset of the content that is visible through the portal, where the subset of the content is content that is near the sides of the portal. Such a visual effect layer may provide a blur effect, e.g., using a gaussian blur filter, a blur kernel, or other blurring technique. A blur effect may be based on blending texture from both a left eye image and a right eye image of the stereo item. A blur effect may account for content present only in the left eye image of the stereo item or content present only in right eye image of the stereo item. For example, the left side of blur may be being driven by the left side of the left image and the right side of the right blur is being driven by the right side of the right image. The visual effect layer may be positioned between the portal and the portion of the stereo item in the 3D coordinate system, as illustrated in FIG. 4

The visual effect layer may be configured and positioned to alter a subset of the content that is visible through the portal, where the subset of the content is content that outside of a perimeter of the portion of the stereo item. Such a visual effect layer may provide content outside of the perimeter of the portion of the stereo item on a background plane, e.g., as illustrated in FIG. 4. The visual effect layer may be blurred content from side regions or cut-off regions of the stereo item.

The visual effect layer may be configured to alter an appearance of a rim of the portal. It may provide a glow effect by increasing a display characteristic (e.g., intensity, saturation, etc.) of the rim of the portal.

In some implementations, the method 600 further transitions to an immersive view. The method 600 may remove the portal and provide the view of portion of the stereo item within the 3D environment without the portal. The method 600 may transition by expanding the portal before removing the portal, expanding the portion of the stereo item, removing the visual effect, and providing a second visual effect, where the second visual effect affects an appearance of the 3D environment visible around the stereo item in the view.

In some implementations, the method repositions the portion of the stereo item relative to the portal based on a scroll input. The stereo item may be repositioned based on a distance of the viewpoint or an angle the portion of the stereo item is scrolled away, or both.

Figure 7:
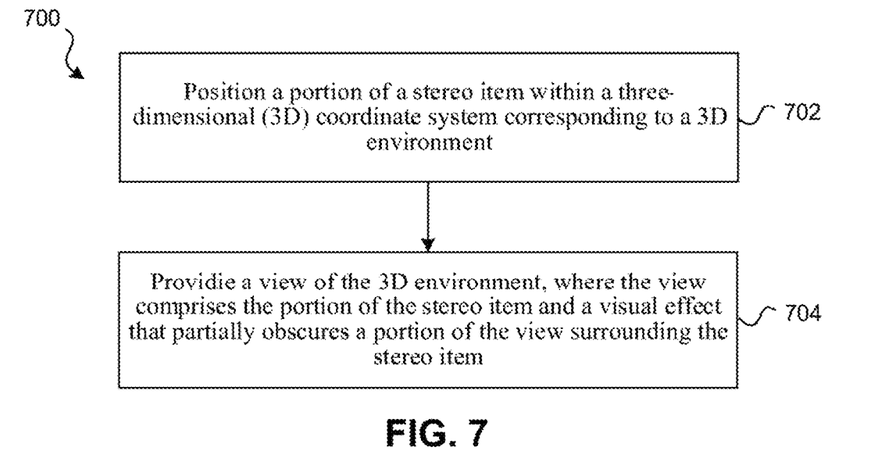
FIG. 7 illustrates an exemplary process for providing an immersive view of a stereo content item within a 3D environment, in accordance with some implementations.

FIG. 7 illustrates an exemplary process 700 for providing an immersive view of a stereo content item within a 3D environment, in accordance with some implementations. In some implementations, a device such as electronic device 110 or another device, or a combination of two or more of such devices, performs method 700. In some implementations, method 700 is performed on a mobile device, desktop, laptop, HMD, ear-mounted device or server device. The method 700 is performed by processing logic, including hardware, firmware, software, or a combination thereof. In some implementations, the method 700 is performed on a processor executing code stored in a non-transitory computer-readable medium (e.g., a memory).

At block 702, the method positions a portion of a stereo item (e.g., it may be cropped portion or all of a stereo photo/video item) within a 3D coordinate system corresponding to a 3D environment. At block 704, the method 700 provides a view of the 3D environment, where the view comprises the portion of the stereo item and a visual effect that partially obscures a portion of the view surrounding the stereo item. FIG. 5 illustrates a view with a visual effect that partially obscures a portion of the view surrounding the stereo item. Such a visual effect may include an alpha fade, e.g., an alpha fade that decreases based on distance from the stereo item in the view.

Figure 8:
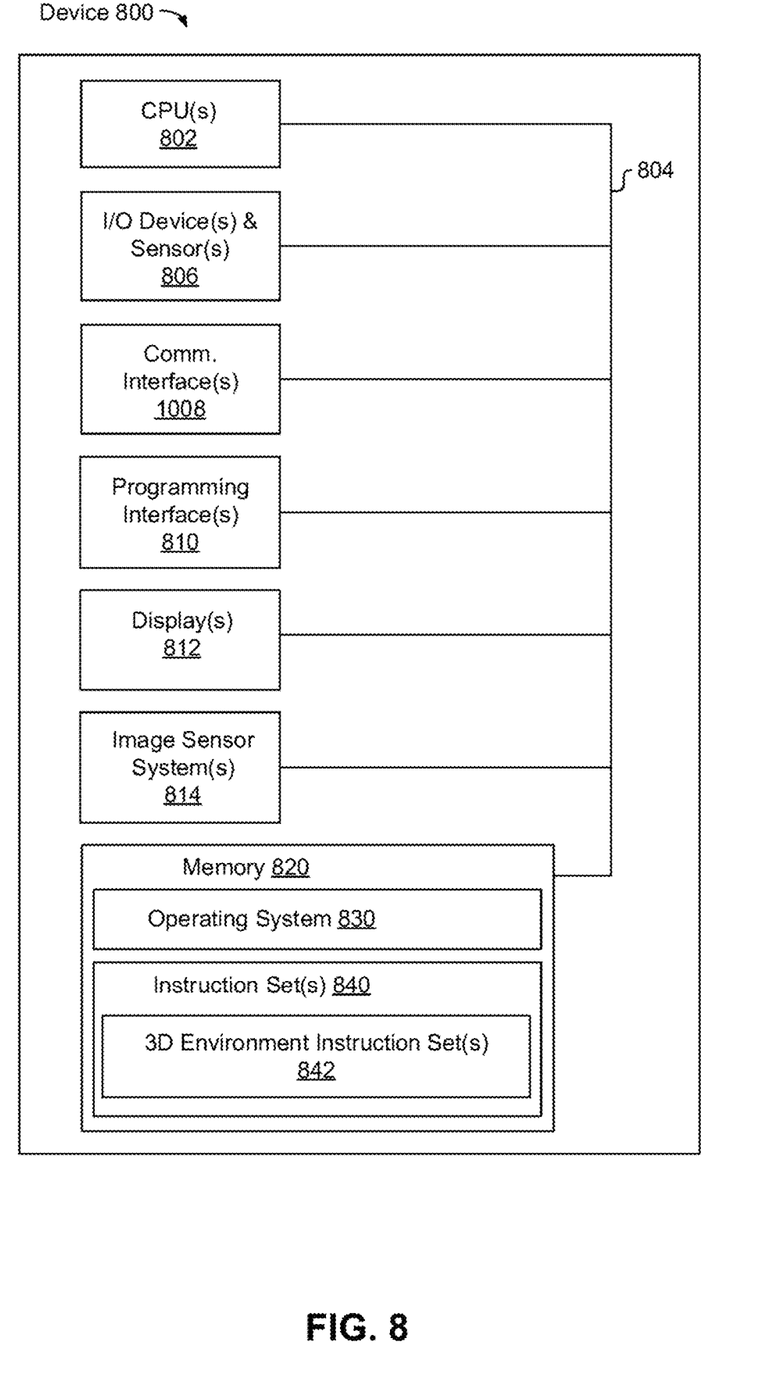
FIG. 8 is a block diagram of an electronic device of in accordance with some implementations.

FIG. 8 is a block diagram of electronic device 800. Device 800 illustrates an exemplary device configuration for electronic device 105 or electronic device 155. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 800 includes one or more processing units 802 (e.g., microprocessors, ASICs, FPGAs, GPUs, CPUs, processing cores, and/or the like), one or more input/output (I/O) devices and sensors 806, one or more communication interfaces 808 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, and/or the like type interface), one or more programming (e.g., I/O) interfaces 810, one or more output device(s) 812, one or more interior and/or exterior facing image sensor systems 814, a memory 820, and one or more communication buses 804 for interconnecting these and various other components.

In some implementations, the one or more communication buses 804 include circuitry that interconnects and controls communications between system components. In some implementations, the one or more I/O devices and sensors 806 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more output device(s) 812 include one or more displays configured to present a view of a 3D environment to the user. In some implementations, the one or more displays 812 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), and/or the like display types. In some implementations, the one or more displays correspond to diffractive, reflective, polarized, holographic, etc. waveguide displays. In one example, the device 800 includes a single display. In another example, the device 800 includes a display for each eye of the user.

In some implementations, the one or more output device(s) 812 include one or more audio producing devices. In some implementations, the one or more output device(s) 812 include one or more speakers, surround sound speakers, speaker-arrays, or headphones that are used to produce spatialized sound, e.g., 3D audio effects. Such devices may virtually place sound sources in a 3D environment, including behind, above, or below one or more listeners. Generating spatialized sound may involve transforming sound waves (e.g., using head-related transfer function (HRTF), reverberation, or cancellation techniques) to mimic natural soundwaves (including reflections from walls and floors), which emanate from one or more points in a 3D environment. Spatialized sound may trick the listener's brain into interpreting sounds as if the sounds occurred at the point(s) in the 3D environment (e.g., from one or more particular sound sources) even though the actual sounds may be produced by speakers in other locations. The one or more output device(s) 812 may additionally or alternatively be configured to generate haptics.

In some implementations, the one or more image sensor systems 814 are configured to obtain image data that corresponds to at least a portion of a physical environment. For example, the one or more image sensor systems 814 may include one or more RGB cameras (e.g., with a complimentary metal-oxide-semiconductor (CMOS) image sensor or a charge-coupled device (CCD) image sensor), monochrome cameras, IR cameras, depth cameras, event-based cameras, and/or the like. In various implementations, the one or more image sensor systems 814 further include illumination sources that emit light, such as a flash. In various implementations, the one or more image sensor systems 814 further include an on-camera image signal processor (ISP) configured to execute a plurality of processing operations on the image data.

The memory 820 includes high-speed random-access memory, such as DRAM, SRAM, DDR RAM, or other random-access solid-state memory devices. In some implementations, the memory 820 includes non-volatile memory, such as one or more magnetic disk storage devices, optical disk storage devices, flash memory devices, or other non-volatile solid-state storage devices. The memory 820 optionally includes one or more storage devices remotely located from the one or more processing units 802. The memory 820 comprises a non-transitory computer readable storage medium.

In some implementations, the memory 820 or the non-transitory computer readable storage medium of the memory 820 stores an optional operating system 830 and one or more instruction set(s) 840. The operating system 830 includes procedures for handling various basic system services and for performing hardware dependent tasks. In some implementations, the instruction set(s) 840 include executable software defined by binary information stored in the form of electrical charge. In some implementations, the instruction set(s) 840 are software that is executable by the one or more processing units 802 to carry out one or more of the techniques described herein.

The instruction set(s) 840 include a 3D environment instruction set 842 configured to, upon execution, provide views of stereo items within 3D environments as described herein. The instruction set(s) 840 may be embodied as a single software executable or multiple software executables.

Although the instruction set(s) 840 are shown as residing on a single device, it should be understood that in other implementations, any combination of the elements may be located in separate computing devices. Moreover, FIG. 8 is intended more as functional description of the various features which are present in a particular implementation as opposed to a structural schematic of the implementations described herein. As recognized by those of ordinary skill in the art, items shown separately could be combined and some items could be separated. The actual number of instructions sets and how features are allocated among them may vary from one implementation to another and may depend in part on the particular combination of hardware, software, and/or firmware chosen for a particular implementation.

It will be appreciated that the implementations described above are cited by way of example, and that the present invention is not limited to what has been particularly shown and described hereinabove. Rather, the scope includes both combinations and sub combinations of the various features described hereinabove, as well as variations and modifications thereof which would occur to persons skilled in the art upon reading the foregoing description and which are not disclosed in the prior art.

As described above, one aspect of the present technology is the gathering and use of sensor data that may include user data to improve a user's experience of an electronic device. The present disclosure contemplates that in some instances, this gathered data may include personal information data that uniquely identifies a specific person or can be used to identify interests, traits, or tendencies of a specific person. Such personal information data can include movement data, physiological data, demographic data, location-based data, telephone numbers, email addresses, home addresses, device characteristics of personal devices, or any other personal information.

The present disclosure recognizes that the use of such personal information data, in the present technology, can be used to the benefit of users. For example, the personal information data can be used to improve the content viewing experience. Accordingly, use of such personal information data may enable calculated control of the electronic device. Further, other uses for personal information data that benefit the user are also contemplated by the present disclosure.

The present disclosure further contemplates that the entities responsible for the collection, analysis, disclosure, transfer, storage, or other use of such personal information and/or physiological data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates implementations in which users selectively block the use of, or access to, personal information data. That is, the present disclosure contemplates that hardware or software elements can be provided to prevent or block access to such personal information data. For example, in the case of user-tailored content delivery services, the present technology can be configured to allow users to select to "opt in" or "opt out" of participation in the collection of personal information data during registration for services. In another example, users can select not to provide personal information data for targeted content delivery services. In yet another example, users can select to not provide personal information, but permit the transfer of anonymous information for the purpose of improving the functioning of the device.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences or settings based on non-personal information data or a bare minimum amount of personal information, such as the content being requested by the device associated with a user, other non-personal information available to the content delivery services, or publicly available information.

In some embodiments, data is stored using a public/private key system that only allows the owner of the data to decrypt the stored data. In some other implementations, the data may be stored anonymously (e.g., without identifying and/or personal information about the user, such as a legal name, username, time and location data, or the like). In this way, other users, hackers, or third parties cannot determine the identity of the user associated with the stored data. In some implementations, a user may access their stored data from a user device that is different than the one used to upload the stored data. In these instances, the user may be required to provide login credentials to access their stored data.

Numerous specific details are set forth herein to provide a thorough understanding of the claimed subject matter. However, those skilled in the art will understand that the claimed subject matter may be practiced without these specific details. In other instances, methods apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:
   at a processor of an electronic device:
   positioning a portal within a three-dimensional (3D) coordinate system corresponding to an extended reality (XR) environment;
   positioning a stereo item within the 3D coordinate system at a distance behind the portal;
   positioning a visual effect layer within the 3D coordinate system, the visual effect layer different than the stereo item and the portal; and
   providing a view of the XR environment based on a viewpoint in front of the portal within the 3D coordinate system, wherein the stereo item is at least partially visible through the portal in the view of the XR environment, and wherein the visual effect layer:
   affects an appearance of the portal;
   affects an appearance of content visible through the portal in the view by providing an imaging effect altering an appearance of the stereo item; or
   affects the appearance of the content visible through the portal in the view by providing additional content visible through the portal in the view, the additional content different than the stereo item.

2. The method of claim 1, wherein the visual effect layer is positioned between the portal and the stereo item in the 3D coordinate system, and wherein the visual effect layer provides a blur effect based on a texture of one or more parts of the stereo item.

3. The method of claim 1, wherein the visual effect layer provides content outside of the perimeter of the stereo item on a background plane, and wherein the visual effect layer comprises blurred content from side regions or cut-off regions of the stereo item.

4. The method of claim 1, wherein the visual effect layer alters an appearance of a rim of the portal by increasing a display characteristic of the rim of the portal.

5. The method of claim 1 further comprising:
   expanding the portal;
   removing the portal;
   expanding the stereo item;
   removing the visual effect layer; and
   providing a visual effect, wherein the visual effect affects an appearance of the 3D environment visible around the stereo item in the view.

6. The method of claim 1 further comprising repositioning the stereo item relative to the portal based on a scroll input based on a distance of the viewpoint and an angle that the stereo item is scrolled away.

7. The method of claim 1, wherein the electronic device is a head-mounted device.

8. The method of claim 1, wherein positioning the visual effect layer comprises:
   positioning an inside visual effect layer;
   positioning a background visual effect layer; and
   positioning a rim visual effect layer.

9. A system comprising:
   a non-transitory computer-readable storage medium; and
   one or more processors coupled to the non-transitory computer-readable storage medium, wherein the non-transitory computer-readable storage medium comprises program instructions that, when executed on the one or more processors, cause the system to perform operations comprising:
   positioning a portal within a three-dimensional (3D) coordinate system corresponding to an extended reality (XR) environment;
   positioning a stereo item within the 3D coordinate system at a distance behind the portal;
   positioning a visual effect layer within the 3D coordinate system, the visual effect layer different than the stereo item and the portal; and
   providing a view of the XR environment based on a viewpoint in front of the portal within the 3D coordinate system, wherein the stereo item is at least partially visible through the portal in the view of the XR environment, and wherein the visual effect layer:
   affects an appearance of the portal;
   affects an appearance of content visible through the portal in the view by providing an imaging effect altering an appearance of the stereo item; or
   affects the appearance of the content visible through the portal in the view by providing additional content visible through the portal in the view, the additional content different than the stereo item.

10. The system of claim 9, wherein the visual effect layer is positioned between the portal and the stereo item in the 3D coordinate system, and wherein the visual effect layer provides a blur effect based on a texture of one or more parts of the stereo item.

11. He system of claim 9, wherein the visual effect layer provides content outside of the perimeter of the stereo item on a background plane, and wherein the visual effect layer comprises blurred content from side regions or cut-off regions of the stereo item.

12. The system of claim 9, wherein the visual effect layer alters an appearance of a rim of the portal by increasing a display characteristic of the rim of the portal.

13. The system of claim 9, wherein the operations further comprise:
- expanding the portal;
- removing the portal;
- expanding the stereo item;
- removing the visual effect layer; and
- providing a visual effect, wherein the visual effect affects an appearance of the 3D environment visible around the stereo item in the view.

14. The system of claim 9, wherein the operations further comprise repositioning the stereo item relative to the portal based on a scroll input based on a distance of the viewpoint and an angle that the stereo item is scrolled away.

15. The system of claim 9, wherein the system is a head-mounted device.

16. The system of claim 9, wherein positioning the visual effect layer comprises:
- positioning an inside visual effect layer;
- positioning a background visual effect layer; and
- positioning a rim visual effect layer.

17. A non-transitory computer-readable storage medium storing program instructions executable via one or more processors to perform operations comprising:
- positioning a portal within a three-dimensional (3D) coordinate system corresponding to an extended reality (XR) environment;
- positioning a stereo item within the 3D coordinate system at a distance behind the portal;
- positioning a visual effect layer within the 3D coordinate system, the visual effect layer different than the stereo item and the portal; and
- providing a view of the XR environment based on a viewpoint in front of the portal within the 3D coordinate system, wherein the stereo item is at least partially visible through the portal in the view of the XR environment, and wherein the visual effect layer:
    - affects an appearance of the portal;
    - affects an appearance of content visible through the portal in the view by providing an imaging effect altering an appearance of the stereo item; or
    - affects the appearance of the content visible through the portal in the view by providing additional content visible through the portal in the view, the additional content different than the stereo item.

18. The non-transitory computer-readable storage medium of claim 17, wherein the visual effect layer is positioned between the portal and the stereo item in the 3D coordinate system, and wherein the visual effect layer provides a blur effect based on a texture of one or more parts of the stereo item.

19. The non-transitory computer-readable storage medium of claim 17, wherein the visual effect layer provides content outside of the perimeter of the stereo item on a background plane, and wherein the visual effect layer comprises blurred content from side regions or cut-off regions of the stereo item.

20. The non-transitory computer-readable storage medium of claim 17, wherein the visual effect layer alters an appearance of a rim of the portal by increasing a display characteristic of the rim of the portal.

21. The non-transitory computer-readable storage medium of claim 17, wherein the operations further comprise:
- expanding the portal;
- removing the portal;
- expanding the stereo item;
- removing the visual effect layer; and
- providing a visual effect, wherein the visual effect affects an appearance of the 3D environment visible around the stereo item in the view.

22. The non-transitory computer-readable storage medium of claim 17, wherein the operations further comprise repositioning the stereo item relative to the portal based on a scroll input based on a distance of the viewpoint and an angle that the stereo item is scrolled away.

23. The non-transitory computer-readable storage medium of claim 17, wherein positioning the visual effect layer comprises:
- positioning an inside visual effect layer;
- positioning a background visual effect layer; and
- positioning a rim visual effect layer.

* * * * *

UNITED STATES PATENT AND TRADEMARK OFFICE
CERTIFICATE OF CORRECTION

PATENT NO. : 12,051,170 B2
APPLICATION NO. : 18/371243
DATED : July 30, 2024
INVENTOR(S) : Bryce L. Schmidtchen et al.

It is certified that error appears in the above-identified patent and that said Letters Patent is hereby corrected as shown below:

In the Claims

Claim 11, Column 20, Line 63, reads:
"11. He system of claim 9, . . ."
Should read:
-- 11. The system of claim 9, . . . --

Claim 17, Column 21, Line 39, reads:
". . . wherein the visual effect layer; . . ."
Should read:
-- . . . wherein the visual effect layer: . . . --

Signed and Sealed this
Third Day of September, 2024

Katherine Kelly Vidal
*Director of the United States Patent and Trademark Office*